F. P. HANSON.
STONE SAW.
APPLICATION FILED DEC. 31, 1908.
947,989.
Patented Feb. 1, 1910.
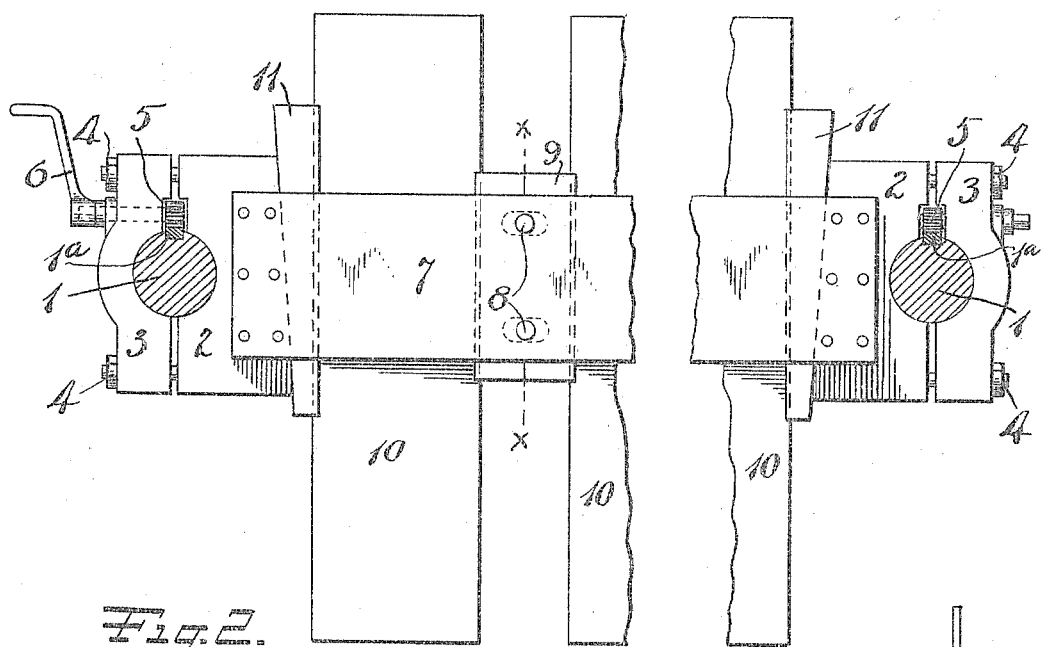
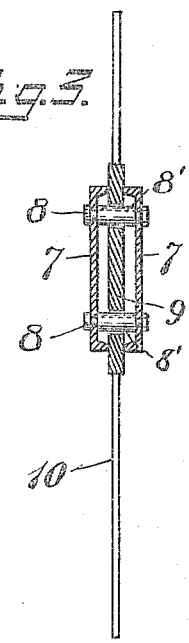
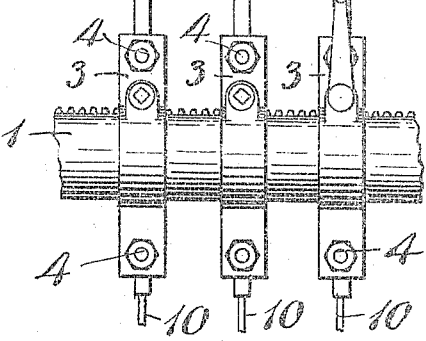
Witnesses:
Chas. M. Peard
Fred M. Dannenfelser
Inventor
F. P. Hanson
By his Attorneys
Bartlett Brownell Mitchell

UNITED STATES PATENT OFFICE.

FRED P. HANSON, OF SAN FRANCISCO, CALIFORNIA, ASSIGNOR TO THE UNITED STATES STONE SAW COMPANY, OF TUCSON, ARIZONA TERRITORY, A CORPORATION OF ARIZONA TERRITORY.

STONE-SAW.

947,989.
Specification of Letters Patent.
Patented Feb. 1, 1910.

Application filed December 31, 1908. Serial No. 470,192.

*To all whom it may concern:*

Be it known that I, FRED P. HANSON, a citizen of the United States, residing at San Francisco, State of California, have invented certain new and useful Improvements in Stone-Saws, of which the following is a full, clear, and exact description.

My invention relates to improvements in stone saws and the like.

This invention relates particularly to the construction of the means for holding, carrying and setting the saw blades, whereby they may be readily adjusted in various directions, and whereby particular blades may be separately adjusted to compensate for irregular wear.

These and other advantages will be apparent to the mechanic skilled in this art.

In the accompanying drawings, Figure 1 is a side elevation of a saw beam, saw beam carrier and certain associated parts, the same being broken away intermediate its length. Fig. 2 is a plan view of certain of the parts shown in Fig. 1. Fig. 3 is a vertical section on the line X—X Fig. 1. Fig. 4 is an end elevation of Fig. 1, the ends of the saw frame being broken away.

I have not illustrated herein the entire saw, since the invention is applicable to a variety of constructions, and since my invention does not relate to other parts of the apparatus than those herein illustrated.

1—1 represent two parallel end frame bars suitably connected in any desired manner (not shown) so as to constitute the end members of a rigid carrier frame, well known in this art. This frame may be reciprocated bodily to and fro, so that when saw blades are carried thereby said saw blades will be reciprocated over the stone which is being cut, in the usual manner. Slidably mounted on these bars 1—1 are head blocks 2—2. Each block 2 is provided with a cap 3, which overstands its respective bar 1 in the manner shown in the drawings.

4—4 are clamping bolts by which the caps 3—3 may be drawn toward the blocks 2, so as to tightly embrace the bars 1—1. Each cap 3 constitutes in effect a portion of the head or block 2.

5 is a pinion carried by each head, each pinion having a suitable shaft bearing, the end of which may be engaged by a crank 6 whereby said pinion may be turned. Each pinion 5 meshes in a rack 1ª carried by or formed in its respective bar 1. By loosening up on the clamping bolts 4, the operator may adjust the blocks 2—2 through the medium of pinions 5 and crank 6 to any desired position upon the bars 1. Extending from the block 2 at one end to the block 2 on the opposite end, are companion saw beam members 7—7, each set or companion pair of beams being suitably secured thereto. The saw beams are preferably of channel iron, the channeled side of each beam in a set facing the channeled side of the opposite beam, as best seen in Fig. 3.

8—8 are through bolts which pass through both beams 7—7 of each set and are arranged to draw said beams toward each other. These bolts also pass through what I term space plates 9, and carry thimbles or sleeves 8′, which serve, when the bolts are tightened up, to hold the beams 7 sufficiently apart to just receive said spacing plates 9. These space plates are preferably grooved along opposite vertical edges to receive and to center and steady the saw blades 10—10.

11—11 are wedges or tightening keys, one of said wedges being arranged between each head 2 and the adjacent saw blade 10, so that, when driven in, all said saw blades will be forced into tight contact with the intermediate space plates 9. The space plates 9 are preferably slightly thicker than the saw blades. When the several blades of the saw have been properly positioned (as to their alinement and vertical adjustment) the keys 11—11 are driven tight, thus rigidly clamping the space plates 9, between which in turn the blades are thereby securely held. In order to afford sufficient freedom for lateral displacement of the space plates, the latter have enlarged bolt-passages for the bolts 8, as indicated in dotted lines, Fig. 1, permitting said space plates to be adjusted laterally without disturbing the bolts 8.

In operation, when the various parts are assembled in their properly adjusted positions, the reciprocal movement to and fro of the saw beams 7—7 will cause the blades 10 to partake of similar movement. As these reciprocate to and fro over the rock to be cut, a suitable abrasive material is commonly employed under the lower edge of each blade. This wears away the stone and thereby forms the cut or "kerf," so-called. When one cut has been fully formed and the saw beam is lifted (in any suitable manner)

it may be quickly adjusted laterally to exactly the desired position by simply loosening up on the bolts 4 and turning the pinions 5—5 the proper direction to cause the blocks 2 to be shifted laterally to the desired extent. Any desired number of companion saw beams may be employed upon the frame sections 1—1, three sets being indicated in Fig. 4. As shown, where a plurality of sets of beams are employed, they may be independently adjusted to any desired extent. If, owing to an uneven wear of any of the saw blades, it becomes necessary to readjust the same, this is quickly and easily effected by simply loosening up on the bolts 8, releasing the keys 11 and allowing such blades as are unduly worn to settle to the proper position, after which by driving in said wedges and setting up on said bolts, the machine is again ready for use.

While I have shown the space plates 9 as provided with a rounded saw-receiving groove at each edge, obviously the particular shape of this saw-receiving groove is immaterial, so long as its tendency is to center or hold its respective saw blade. By this arrangement it will be observed that I avoid the necessity of passing the bolts 8—8 through the saw blades themselves. Furthermore, by this arrangement it is unnecessary for the saw beams to directly engage the blades, said blades being sufficiently supported against independent movement in any direction by the space blocks or plates 9, when the latter are set toward each other and clamped down.

It should be stated that the blade engaging edge of each wedge 11—11 will also be grooved to receive and center the edge of its adjacent saw blade. By forming the saw beams of channel iron, great strength with a minimum weight is attained.

What I claim is:

1. In a stone saw, a pair of companion saw beams, saw blades arranged between said beams, space plates arranged between the saw blades, wedge plates at the ends of a series of saw blades, being of greater thickness than said saw-blades serving to hold said saw blades from movement in all directions independently thereof, and means for clamping said space plates between said pair of companion saw beams.

2. In a stone sawing machine, parallel frame bars, heads longitudinally adjustable thereon, companion saw beams connecting said heads, adjusting means carried by its respective frame bar and operatively engaging another part for adjusting said saw beams laterally and clamping means coöperating with said adjusting means.

3. In a stone saw, a pair of companion saw beams, means for drawing said beams toward each other, a saw blade arranged to stand between said beams, and means independent of said beams for clamping and holding said saw blade in place between said beams.

4. In a stone saw, a pair of companion saw beams, means for drawing said beams toward each other, a saw blade arranged to stand between said beams, and means independent of said beams for clamping and holding said saw blade in place between said beams, said means comprising plates arranged at opposite edges of the blade, said plates being grooved at their edges to receive said blade and center and grip the same.

5. In a stone saw, a pair of companion saw beams, means for drawing said beams toward each other, a saw blade arranged to stand between said beams, means independent of said beams for clamping and holding said saw blade in place between said beams, said means comprising plates arranged on opposite edges of the blade, said plates being grooved at their edges to receive said blade and center and grip the same, and means to force said plates laterally into intimate engagement with the blade.

FRED P. HANSON.

Witnesses:
ROBERTSON T. McKISICK,
HENRY W. ARNOLD.

It is hereby certified that in Letters Patent No. 947,989, granted February 1, 1910, upon the application of Fred P. Hanson, of San Francisco, California, for an improvement in "Stone-Saws," an error appears in the printed specification requiring correction, as follows: Page 2, line 48, before the word "being" the words *said plates* should be inserted; and that the said Letters Patent should be read with this correction therein that the same may conform to the record of the case in the Patent Office.

Signed and sealed this 22d day of February, A. D., 1910.

[SEAL.]

C. C. BILLINGS,
*Acting Commissioner of Patents.*